United States Patent Office 3,107,254
Patented Oct. 15, 1963

3,107,254
17β-DIALKYLAMINO - 17 - CYANOSTEROIDS AND THEIR 17α-ALKYL, ALKYLENE AND ALKYNE DERIVATIVES
Daniel Lednicer, Kalamazoo, Mich., assignor to The Upjohn Company, Kalamazoo, Mich., a corporation of Delaware
No Drawing. Filed Oct. 5, 1960, Ser. No. 60,574
22 Claims. (Cl. 260—397.3)

This invention relates to novel 17β-di-lower-alklyamino-17-cyanoandrostenes, 17β-di-lower-alkylamino-17-cyanoandrostanes and 17β-di-lower-alkylamino-17-cyanoestratrienes, their 17α-alkyl, 17α-alkylene and 17α-alkyne derivatives and their 11β-hydroxy derivatives. It also relates to a process for their production. The aforementioned compounds coming within the scope of this invention have pharmacological usefulness as anti-fungal, anti-bacterial, anti-inflammatory, cholesterol lowering, central nervous system regulating and diuretic agents.

The compounds of this invention and particularly those of the examples, below, can be prepared and administered to mammals, birds and animals in a wide variety of oral and parenteral dosage forms, singly, or in admixture with other coacting compounds. They can be associated with a carrier which can be a solid material or a liquid in which the compound is dissolved, dispersed or suspended. The solid compositions can take the form of tablets, powders, capsules, pills, or the like, preferably in unit dosage forms for simple administration or precise dosage forms. The liquid compositions can take the form of solutions, emulsions, suspensions, syrups or elixirs.

The compounds of this invention can be represented by the formula:

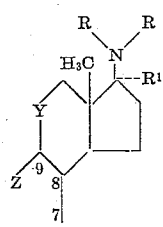

wherein R is a lower-alkyl radical, preferably selected from the group consisting of methyl and ethyl; $R^1$ is a lower-alkyl, alkylene or alkyne radical, preferably selected from the group consisting of $CH_3$, $C_2H_5$, $C_3H_7$, $C\equiv CH$, $C\equiv C-CH_3$, $CH=CH_2$, $-CH_2-CH=CH_2$ and $CN$; Y is selected from the group consisting of the methylene radical, $>CH_2$ and the β-hydroxymethylene radical

Z is selected from the group consisting of

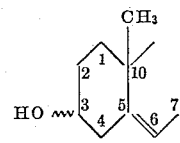

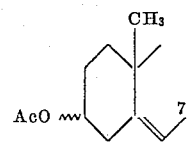

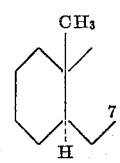

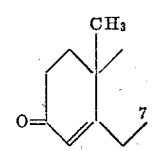

and

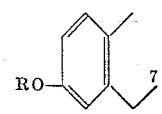

wherein R has the same value as above, Ac is the acyl radical of a hydrocarbon carboxylic acid containing from 1 to 12 carbon atoms, inclusive, and ~ is a generic expression denoting α and β bonds and mixtures thereof. The structure of Z can additionally include non-interfering bonds and substituents.

The compounds of this invention can be prepared in accordance with the following flow sheets, the various steps of which are illustrated in detail in the examples which follow.

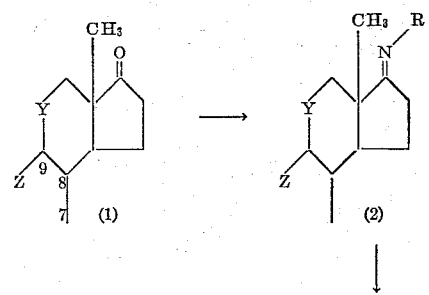

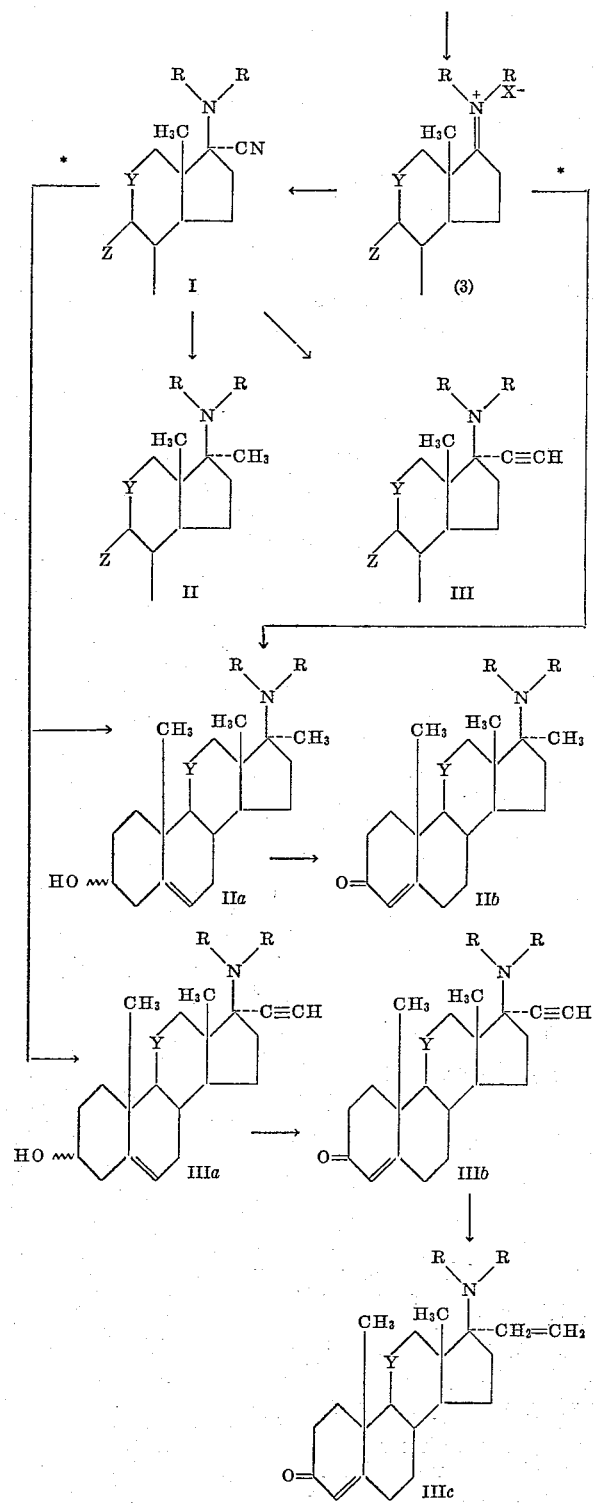

wherein R is selected from the group consisting of methyl and ethyl; X⁻ is a halogen; Y is selected from the group consisting of the methylene radical, >CH₂, and the β-hydroxymethylene radical,

and Z is selected from the group consisting of

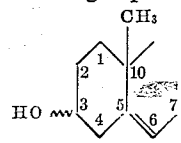

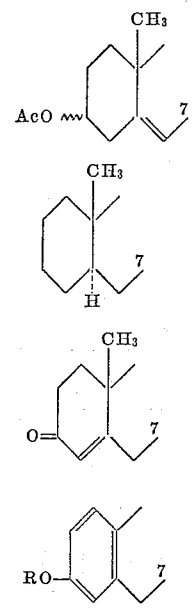

wherein R has the same value as above, Ac is the acyl radical of a hydrocarbon carboxylic acid containing from 1 to 12 carbon atoms, inclusive, and ∼ is a generic expression denoting α and β bonds and mixtures thereof. * indicates that the reaction sequences following it occur when Z in Formula I and (3) is restricted to

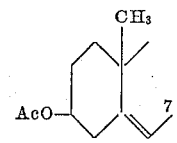

The 17α-cyano compounds (I) of this invention, e.g., 17β-dimethylamino-17-cyanoandrost-5-en-3β-ol acetate, 17β-dimethylamino-17-cyano-5α-androstan-11β-ol and 17β-dimethylamino-17-cyano-3-methoxyestra-1,3,5-triene, are prepared from known starting materials (1) indicated in the examples, namely, androst-5-en-3β-ol-17-one, 5α-androstan-11β-ol-17-one and estrone methyl ether, respectively.

The above starting materials, conveniently in the form of melts, are reacted with methylamine vapors to yield the intermediates represented by (2) of the flow-sheet- e.g., 17-methyliminoandrost-5-en-3β-ol acetate, 17-methylimino-5α-androstan-11β-ol and 3-methoxyestra-1,3,5-triene-17-methylimine, respectively; isolation and purification is carried out by conventional means. The condensation of methylamine or ethylamine with 17-ketosteroids is ordinarily carried out at the melting point of the steroid or above; the reaction proceeds faster at higher than at lower temperatures, with those preferred being in the range of 150 to 250° C. An additive such as pyridine, ethylene glycol, chloesterol and the like can be used with steroids melting at high temperatures to lower the melting point. Ordinarily a large excess of methylamine is used in a slow stream to assist removal of water. On a small scale methylamine is bubbled through the melt of steroid compound at a rate of about 1 bubble/second, while with a larger batch, more rapid addition is desirable to prevent unduly long heating of the melt. The reaction is considered complete when examination of the infrared spectrum of an aliquot of the melt reveals little or no remaining absorption due to the 17-ketone function (about 1730 to 1745 cm.⁻¹). A reaction period of between 1 and 48 hours is satisfactory to produce this spectral change and one between 3 and 8 hours is preferred. As little as one equivalent of methylamine can be employed in this reaction, but more than this amount is used to assure completion of the reaction. Since excess methylamine is usually not harmful an excess is used, preferably more than two equivalents. Other organic primary amines, e.g., n-propylamine, n-butylamine, benzylamine and the like, can be substituted for methylamine or ethylamine; they are added dropwise as liquids continuously into the steroid melts. If desired a solvent can be used in the reaction between the appropriate amine and 17-ketosteroid, the boiling point of the solvent serving as its upper temperature limit. Suitable solvents include benzene, toluene, xylene, mesitylene, ethylene glycol dimethylether, pyridine and the like. When gaseous amines are employed they are passed continuously through the solution of starting material, the water and amine vapors being permitted to escape. Higher boiling amines can also be used in the reaction, water being removed by azeotropic distillation with an immiscible solvent such as toluene, by simple distillation of water from the solution, or by passing the vapors through an absorbent (e.g., calcium carbide) that selectively removes water.

The compounds represented by (2) of the flow-sheet are converted to those embraced by (3) by reaction with a suitable alkyl halide, preferably methyl iodide. Thus, 17 - methyliminoandrost - 5 - en-3β-ol acetate, 17-methylimino-5α-androstan - 11β - ol and 3 - methoxyestra-1,3,5-triene - 17 - methylimine, when dissolved in a suitable solvent and reacted with methyl iodide yield 3β-hydroxyandrost - 5 - en - 17 - dimethyliminium iodide acetate, 5α-androstan-11β-ol-17-dimethyliminium iodide, respectively. Isolation and purification is by means known in the art such as precipitation, evaporation of solvent and recrystallization.

The dialkyliminium halides of (3) are dissolved in a suitable solvent such as methyl cyanide or dimethylformamide and readily converted to their corresponding 17α-cyano compounds (I) by reacting them with potassium cyanide or sodium cyanide. These compounds, e.g., 17β-dimethylamino-17-cyanoandrost-5-en - 3β - ol acetate and 17β-dimethylamino - 17 - cyano-3-methoxyestra-1,3,5-triene, are isolated from their reaction mixtures and crystallized by conventional procedures, such as precipitation and filtration.

The 17α-cyano compounds (I) can be converted to their corresponding 17α-alkyl derivatives (II, IIa and IIb). These 17α-alkyl compounds can readily be prepared by dissolving the compounds of I in a suitable solvent and heating the resulting solution with an alkylmagnesium halide, conveniently at reflux temperatures. Isolation and crystallization of the product is by conventional methods known in the steroid art, such as washing, drying and evaporating the solvent containing the desired product. Following this general procedure, 17β-dimethylamino - 17 - cyanoandros - 5 - en - 3β - ol acetate (I) 17β-dimethylamino-17-cyano - 5α - androstan-11β-ol (I) and 17β-dimethylamino-17-cyano - 3 - methoxyestra-1,3,5-triene (I) can be converted to 17β-dimethylamino-17 - methylandrost-5-en-3β-ol (IIa), 17β - dimethylamino-17 - methyl-5α-androstan-11β-ol (II) and 17β-dimethylamino-17-methyl-3-methoxyestra-1,3,5-triene (II), respectively. The compound of IIa is converted by conventional Oppenauer oxidation with aluminum isopropoxide to 17β-dimethylamino - 17 - methylandrost-4-en-3-one (IIb). An alternative route for the preparation of 17β-dimethylamino-17-methylandrost-5-en-3β-ol (IIa) comprises heating 3β-hydroxyandrost-5-en-17-dimethyliminium iodide acetate (3) in a suitable solvent with an alkyl magnesium halide, followed by conventional isolation and crystallization of the product.

The 17α-cyano compounds (I) can be converted to their corresponding 17α-alkynyl derivatives (III, IIIa and IIIb) by dissolving the compounds embraced by I in a suitable solvent such as tetrahydrofuran, adding an alkylnylmagnesium halide thereto and heating the resulting reaction mixture, conveniently at reflux temperature, for a period of from about several hours to about several days. Isolation, purification and crystallization of the 17α-alkynyl product is carried out by conventional means known in the steroid art, such as concentrating the reaction mixture under vacuum, dissolving the resulting residue in suitable solvents, washing the solvent solution with water, extracting with dilute acid followed by precipitation of the desired product on alkalinizing the acid extract. These procedures are similarly utilized in the preparation of 17β-dimethylamino-17-ethynyl-5α-androstan-11β-ol (III), 17β - dimethylamino-17-ethynylandrost-5-en-3β-ol (IIIa) and 17β - dimethylamino - 17-ethynyl-3-methoxyestra-1,3,5-triene (III) from 17β - dimethylamine-17-cyano-5α-androstan-11β-ol (I), 17β - dimethylamino-17-cyanoandrost-5-en-3β-ol acetate (I) and 17β - dimethylamino-17-methyl-3-methoxyestra - 1,3,5-triene (I), respectively. The compound of IIIa is converted by conventional Oppenauer oxidation with aluminum isopropoxide to 17β-dimethylamino - 17 - ethynyl androst-4-en-3-one (IIIb). The compound of IIIb when reacted with hydrogen in the presence of a suitable palladium catalyst, e.g., 5 percent palladium on charcoal, yields 17β - dimethyl-amino-17-vinylandrost - 4 - en-3-one (IIIc).

EXAMPLE 1

*17β-Dimethylamino-17-Cyanoandrost-5-En-3β-Ol Acetate (17β-N,N-Dimethylamino-17-Cyano-5-Androsten-3β-Ol Acetate) (I)*

A stream of methylamine was bubbled through a melt of 10 g. of the known compound androst-5-en-3β-ol-17-one acetate ("Steroids," Fieser and Fieser, Reinhold, N.Y., 1959, page 514) [(1) of flow-sheet] in a flask held in a bath at 195 to 200° C. for a period of about 6 hours. The melt was allowed to cool under an atmosphere of nitrogen, dissolved in methylene chloride and the resulting solution washed with water. Evaporation of the methylene chloride yielded a solid, 17-methyliminoandrost-5-en-3β-ol acetate [(2) of flow-sheet] showing infrared absorption bands at 1723 and 1675 cm.$^{-1}$. This imine was dissolved in 50 ml. of methylene chloride, treated with 60 ml. of methyliodide and allowed to stand for a period of about 3.5 hours. The semisolid ternary iminium salt, 3β-hydroxyandrost-5-en-17-dimethyliminium iodide acetate [(3) of flow-sheet], obtained when this mixture of reactants was poured into ether, was quickly dissolved in 100 ml. of methyl cyanide. This solution was then added to 6 g. of potassium cyanide in 60 ml. of water with active stirring. After about 40 minutes the suspension was diluted with about 800 ml. of water and the precipitated solid material collected on a filter to give 5.36 g. of product with a melting point of 146 to 152° C. A small amount of this compound was recrystallized twice from hexane (cooled to −20° C.) to yield an analytical sample of 17β-dimethylamino-17-cyanoandrost-5-en-3β-ol acetate (I) with a melting point of 145 to 150° C. and λ max. 2780, 2210, 1732–1725 and 1670 cm.$^{-1}$.

*Analysis.*—Calcd. for $C_{24}H_{36}N_2O_2$: C, 74.96; H, 9.44; N, 7.29. Found: C, 74.84; H, 9.44; N, 737.

In the same manner as in Example 1, but substituting for methylamine and methyl iodide another alkylamine and another alkyl halide (such as ethylamine and ethyl iodide), is productive of the corresponding 17β-diethylamino-17-cyanoandrost-5-en-3-ol acetate (I).

EXAMPLE 2

*17β-Dimethylamino-17-Cyanoandrost-5-En-3β,11β-Diol 3-Acetate (17β-N,N-Dimethylamino-17-Cyano-5-Androsten-3β,11β-Diol 3-Acetate) (I)*

In the same manner as in Example 1, but substituting as starting material, 11β-hydroxydehydroisoandrosterone 3-acetate [(1) of flow-sheet] for dehydroisoandrosterone acetate, is productive of the corresponding 17β-dimethylamino-17-cyanoandrost-5-en-3β,11β-diol 3-acetate (I). The starting 11β-hydroxydehydroisoandrosterone 3-acetate is prepared as follows: A solution of 1.4 g. of 3β,11β,17α,21-tetrahydroxy-5-pregnene-20-one (U.S. Patent 2,899,448) in 125 ml. of acetic acid is treated with 50 ml. of water followed by 3 g. of sodium bismuthate (NaBiO₃). The reaction mixture is then made alkaline with 20% aqueous sodium hydroxide and the mixture filtered. Both the filtrate and residue are washed with methylene chloride and the extracts evaporated to dryness. A solution of the residue chromatographed over a column of Florosil (synthetic magnesium silicate) yielded 3β,11β-dihydroxy-5-androstene-17-one having λ max. 1740 cm.$^{-1}$. This crude diol is allowed to stand for a period of about 15 hours with 10 ml. of pyridine and 10 ml. of acetic anhydride; dilution of the mixture with water, followed by chromatographing on Florosil yields 11β-hydroxyisoandrosterone 3-acetate (3β,11β-dihydroxy-5-androsten-17-one 3-acetate) having λ max. 1740, 1725 cm.$^{-1}$.

EXAMPLE 3

*17β - Dimethylamino - 17 - Cyano - 5α-Androstan-11β-Ol (17β - N,N - Dimethylamino - 17-Cyano-5α-Androstan-11β-Ol) (I)*

A stream of methylamine was bubbled into a melt of 3 g. of the known compound 5α-androstan-11β-ol-17-one [(1) of flow-sheet] (U.S. Patent 2,881,188) maintained at a temperature between about 200 and 210° C. for a period of approximately 7 hours. After cooling under an atmosphere of nitrogen, the product was dissolved in methylene chloride, washed with water, and the extract evaporated to dryness to give 17-methylimino-5α-androstan-11β-ol [(2) of flow-sheet] exhibiting infrared absorption at 3220 and 1676 cm.$^{-1}$. This crude imine was dissolved in 50 ml. of methylene chloride, treated with 10 ml. of methyl iodide and allowed to stand for a period of about 3 hours. Ether was then added and solid material consisting of 5α-androstan-11β-ol-17-dimethyliminium iodide [(3) of flow-sheet] separated. The solid was dissolved in 100 ml. of hot, dry dimethylformamide and quickly added to a solution of 3 g. of potassium cyanide in 30 ml. of water. After about 45 minutes the reaction mixture was diluted with water to yield fine needles of the crude aminonitrile product. Two crystallizations from ethyl acetate-hexane gave 2.48 g. of 17β-dimethylamino-17-cyano-5α-androstan-11β-ol with a melting point of 197 to 203° C. and max. 3540, 3470, 2760 and 2220 cm.$^{-1}$.

*Analysis.*—Calcd. for $C_{22}H_{36}N_2O$: C, 76.69; H, 10.53; N, 8.13. Found: C, 76.55; H, 10.89; N, 8.04.

In the same manner as in Example 2, but substituting for methylamine and methyl iodide another alkylamine and another alkyl halide, is productive of the corresponding 17β-dialkylamino-17-cyano-5α-androstan-11β-ol (I).

EXAMPLE 4

*17β-Dimethylamino-17-Cyano-5α-Androstan (17β-N,N-Dimethylamino-17-Cyano-5α-Androstan) (I)*

In the same manner as in Example 3, but substituting as starting material, the known compound 5α-androstan-17-one [(1) of flow-sheet] ("Optical Rotatory Dispersion," Djerassi, C., McGraw-Hill, N.Y., 1960, page 44), for 5α-androstan-11β-ol-17-one, is productive of the corresponding 17-dimethylamino-17-cyano-5α-androstan (I).

EXAMPLE 5

*17β - Dimethylamino - 17 - Cyano-3-Methoxyestra-1,3,5-Triene (17β-N,N-Dimethylamino - 17 - Cyano-3-Methoxy-1,3,5-Estratriene) (I)*

A stream of methylamine was bubbled through a melt of 5 g. of estrone methyl ether ("Steriods," Fieser and Fieser, Reinhold, N.Y., 1959, page 548) [(1) of flow-sheet] heated to a temperature of about 195° C. for approximately 7 hours. The cooled solid was dissolved in methylene chloride and the resulting solution washed with water. Evaporation of the solvent yielded a solid, 3-methoxyestra-1,3,5-triene-17-methylimine [(2) of flow-sheet]. This imine was dissolved in 50 ml. of methylene chloride, treated with 15 ml. of methyl iodide and allowed to stand for a period of about 2 hours. The solid 3-methoxyestra-1,3,5-triene - 17 - dimethyliminium iodide [(3) of flow-sheet], obtained when this mixture of reactants was poured into 500 ml. of ether, was dissolved in 120 ml. of methyl cyanide and added to 50 ml. of a 10 percent aqueous solution of potassium cyanide. After standing for a period of about 1 hour, the solution was diluted with water resulting in the precipitation of 4.8 g. of solid with a melting point of 140 to 147° C.; recrystallization from a mixture of ethyl acetate and hexane gave 4.15 g. of this compound with a melting point of 148 to 150° C. A sample of this material was again recrystallized from the same solvents to yield 17β-dimethylamino - 17 - cyano-3-methoxyestra-1,3,5-triene (I) with a melting point of 148 to 150° C.

*Analysis.*—Calcd. for $C_{22}H_{30}N_2O$: C, 78.06; H, 8.93; N, 8.28. Found: C, 78.27; H, 9.13; N, 826.

In the same manner as in Example 5, but substituting for methylamine and methyl iodide another alkylamine and another alkyl halide, is productive of the corresponding 17β - dialkylamino - 17 - cyano-3-methoxyestra-1,3,5-triene (I).

EXAMPLE 6

*17β - Dimethylamino - 17 - Cyano - 3-Methoxyestra-1,3,5-Triene - 11β-Ol (17β-N-N-Dimethylamino - 17-Cyano-11β-Ol-3-Methoxy-1,3,5-Estratriene) (I)*

In the same manner as in Example 5, but substituting as starting material, 3-methoxy-11β-hydroxy-1,3,5(10)-estratriene-17-one [(1) of flow sheet] [prepared as in J. Amer. Chem. Soc. 80, 2220 (1958) (see Compound XXIII)] for estrone methyl ether, is productive of the corresponding 17β - dimethylamino - 17 - cyano - 3 - methoxyestra-1,3,5-triene-11β-ol (I).

EXAMPLE 7

*17β - Dimethylamino - 17 - Methylandrost - 5 - En - 3β-Ol (17β - N,N - Dimethylamino - 17 - Methyl-5-Androsten-3β-Ol) (IIa)*

A. A solution of 1 g. (0.0026 mole) of 17β-dimethylamino-17-cyanoandrost-5-en-3β-ol acetate (I) (prepared as in Example 1) in 30 ml. of tetrahydrofuran was added to 10 ml. of 3 molar methylmagnesium bromide in ether. The reaction mixture was heated under reflux for a period of about 2 hours, following which the excess Grignard reagent was destroyed with water and additional water, ether and also methylene chloride added. The organic layer was washed well with brine, dried by percolation through magnesium sulfate and the solvent removed under vacuum. The glassy solid residue was crystallized from aqueous methanol to give 0.55 g. of fine plates of 17β-dimethylamino-17-methylandrost-5-en-3β-ol (IIa), with a melting point of 149 to 152° C. Recrystallization from the same solvent gave an analytical sample having a melting point of 149 to 151.5° C. and max. 3400, 3320–3100, 2750 and 1663 cm.$^{-1}$.

*Analysis.*—Calculated for $C_{22}H_{37}NO \cdot \frac{1}{4} H_2O$: C. 78.44; H, 11.25; N, 4.17. Found: C, 78.26; H, 11.28; N, 4.25.

Heating the hydrated compound in a vacuum oven yielded the corresponding anhydrous compound with the empirical formula: $C_{22}H_{37}NO$.

In the same manner as in Example 7, but substituting for 17β-dimethylamino-17-cyanoandrost-5-en-3β-ol acetate and methylmagnesium bromide another 17β-dialkylamino-17-cyanoandrost-5-en-3β-ol acetate and another alkylmagnesium halide, is productive of the corresponding 17β-dialkylamino-17-alkylandrost-5-en-3β-ol (IIa).

B. A solution of 0.5 g. of the ternary iminium salt, 3β-hydroxyandrost-5-en-17-dimethyliminium iodide acetate [(3) of flow sheet], in 30 ml. of tetrahydrofuran was added to 7.5 ml. of 3 molar methylmagnesium bromide. After heating the reaction mixture for a period of about 3 hours the excess Grignard reagent was decomposed with water and additional water, ether and also methylene chloride added. The organic layer was washed thoroughly with concentrated sodium chloride solution, dried by percolation through magnesium sulfate and the solvent removed. The crude residue was crystallized from aqueous methanol to give 0.2 g. (59 percent yield) of 17β-dimethylamino-17-methylandrost-5-en-3β-ol (IIa), with a melting point of 148 to 149.5° C. The melting point of this product was not depressed on mixing with a sample of the compound obtained by the process of A.

In the same manner as in Example 7, but substituting for 3β-hydroxyandrost-5-en-17-dimethyliminium iodide acetate and methylmagnesium bromide another 3β-hydroxyandrost-5-ene-17-dialkyliminium halide acetate and another alkyl magnesium halide, is productive of the corresponding 17β-dialkylamino-17-alkylandrost-5-en-3β-ol (IIa).

EXAMPLE 8

*17 - Dimethylamino - 17 - Methylandrost - 5 - En-3β,11β-Diol (17β, N,N - Dimethylamino - 17-Methyl-5-Androsten-3β,11β-Diol) (IIa)*

In the same manner as in Example 7, but substituting as starting material, 17β-dimethylamino-17-cyanodrost-5-en-3β,11β-diol 3-acetate (I) (prepared as in Example 2) for 17β-dimethylamino-17-cyanodrost-5-en-3β-ol acetate, is productive of the corresponding 17β-dimethylamino-17-methylandrost-5-en-3β,11β-diol 3-acetate (IIa).

EXAMPLE 9

*17β - Dimethylamino - 17-Methylandrost - 4 - En - 3 - One (17β - N,N, - Dimethylamino-17-Methyl-4-Androsten-3-One) (IIb)*

One gram of 17β-dimethylamino-17-methylandrost-5-en-3β-ol (IIa) (prepared as in Example 7) was dissolved in 8.5 ml. of cyclohexanone and 50 ml. of toluene. About 4 ml. of solvent was removed by distillation and 0.55 g. of aluminum isopropoxide dissolved in 10 ml. of toluene added to the steroid solution. The solution of reactants was heated under reflux with stirring for a period of about 2 hours, a small amount of water then added and the solution concentrated under vacuum. The residue was extracted with a mixture of ether and methylene chloride and the extract washed with brine. The clear organic layer was extracted with 100 ml. of 2.5 N hydrochloric acid. A crude solid product was obtained when the extract was made alkaline. Recrystallization from aqueous methanol gave 0.71 g. of a product with a melting point of 140 to 143.5° C. Two further crystallizations of a sample of this product yielded pure 17β-dimethylamino-17-methylandrost-4-en-3-one (IIb) with a melting point of 140.5 to 144° C. and λ max. 2780, 1675 and 1617 cm.$^{-1}$.

*Analysis.*—Calcd. for $C_{22}H_{35}NO$: C, 80.19; N, 4.25. Found: C, 80.54; N, 4.51.

EXAMPLE 10

*17β - Dimethylamino - 17 - Methylandrost-4-En-11β-Ol-3-One (17β-N,N-Dimethylamino-17-Methyl-4-Androsten-11β-Ol-3-One) (IIb)*

In the same manner as in Example 9, but substituting as starting material, 17β-dimethylamino-17-methylandrost-5-en-3β,11β-diol (IIa) (prepared as in Example 8) for 17β-dimethylamino-17-methylandrost-5-en-3β-ol, is productive of the corresponding 17β-dimethylamino-17-methylandrost-4-en-11β-ol-3-one (IIb).

EXAMPLE 11

*17β - Dimethylamino - 17 - Ethynylandrost - 5 - En-3β-Ol 17β - N,N-Dimethylamino-17-Ethynyl-5-Androsten-3β-Ol) (IIIa)*

A stream of acetylene was bubbled through an ether-free solution of 0.19 mole of methylmagnesium bromide in 30 ml. of tetrahydrofuran for a period of about 1.5 hours. 6.12 g. of 17β-dimethylamino-17-cyanoandrost-5-en-3β-ol acetate (I) (prepared as in Example 1) in 12 ml. of tetrahydrofuran was added to the unsaturated Grignard product. This reaction mixture was heated under reflux for a period of about 16 hours and allowed to cool. Water, methylene chloride and ether were added, and the organic layer separated. The organic layer was washed thoroughly with brine and then extracted with 100 ml. of 0.5 N hydrochloric acid. The crude material obtained on making the acidic solution alkaline, was crystallized from aqueous methanol to give 3.5 g. of product with a melting point of 200 to 203° C. Recrystallization of a sample of this product yielded pure 17β-dimethylamino-17-ethynylandrost-5-en-3β-ol (IIIa) with a constant melting point of 206 to 208° C. and an infrared absorption spectrum showing evidence of hydration.

*Analysis.*—Calcd. for $C_{22}H_{35}NO \cdot \frac{1}{4}H_2O$: C, 80.06; H, 10.37; N, 4.06. Found: C, 80.33; H, 10.24; N, 4.42.

Heating the hydrated compound in a vacuum oven yielded the corresponding anhydrous compound with the empirical formula: $C_{23}H_{35}NO$.

Following the procedure of Example 11, but substituting methylacetylene for acetylene, yields 17β-dimethylamino-17-propynylandrost-5-en-3β-ol.

EXAMPLE 12

*17β - Dimethylamino-17-Ethynylandrost-5-En-3β,11β-Diol (17β - N,N-Dimethylamino-17-Ethynyl-5-Androsten-3β,11β-Diol) (IIIa)*

In the same manner as in Example 11, but substituting as starting material, 17β-dimethylamino-17-cyanoandrost-5-en-3,11β-diol 3-acetate (I) (prepared as in Example 2) for 17β-dimethylamino-17-cyanoandrost-5-en-3β-ol acetate, is productive of the corresponding 17β-dimethylamino-17-ethynylandrost-5-en-3β,11β-diol (IIIa).

EXAMPLE 13

*17β-Dimethylamino-17-Ethynylandrost-4-En-3-One (17β-N,N - Dimethylamino-17-Ethynyl-4-Androsten-3-One) (IIIb)*

The solvent was distilled from a solution of 3 g. of 17β-dimethylamino-17-ethynylandrost-5-en-3β-ol (IIIa) (prepared as in Example 11) in 25.5 ml. of cyclohexanone and 150 ml. of toluene until no more water was contained in the distillate. A solution of 1.65 g. of aluminum isopropoxide in toluene was added to the steroid and the reaction mixture heated at reflux temperature for a period of about 3 hours. Water was then added and most of the solvent removed under vacuum. The residue was dissolved in ether, washed with water and the organic layer washed with 0.5 N HCl. The acid extract was made basic to give 2.37 g. of crude product. Three recrystallizations of this material from aqueous methanol yielded 1.29 g. of 17β-dimethylamino-17-ethynylandrost-4-en-3-one (IIIb) with a melting point of 158 to 161° C. and λ max. 3240, 1680, 1613 cm.$^{-1}$.

*Analysis.*—Calcd. for $C_{23}H_{33}NO$: C, 81.36; H, 9.80; N, 4.13. Found: C, 81.06; H, 10.02; N, 4.18.

EXAMPLE 14

*17β - Dimethylamino-17-Ethynylandrost-4-En-11β-Ol-3-One (17β - N,N-Dimethylamino-17-Ethynyl-4-Androsten-11β-Ol-3-One) (IIIb)*

In the same manner as in Example 13, but substituting as starting material, 17β-dimethylamino-17-ethynylandrost-5-en-3β,11β-diol (IIIa) (prepared as in Example 12) for 17β-dimethylamino-17-ethynylandrost-5-en-3β-ol, is productive of the corresponding 17β-dimethylamino-17-ethynylandrost-4-en-11β-ol-3-one (IIIb).

EXAMPLE 15

*17β - Dimethylamino-17-Vinylandrost-4-En-3-One (17β-N,N - Dimethylamino - 17-Vinyl-4-Androsten-3-One) (IIIc)*

A suspension of 0.3 g. of a catalyst (composed of 5 percent palladium on charcoal) in 200 ml. of pyridine was shaken under an atmosphere of hydrogen for a period of about 45 minutes, then 1.5 g. of 17β-dimethylamino-17-ethynylandrost-4-en-3-one (IIIb) (prepared as in Example 13) was added. After a period of about 4 hours when the theoretical amount of hydrogen was observed to have been combined with the steroid solution, the catalyst was removed by filtration and the solution concentrated under vacuum to a volume of 5 to 10 ml. The solid obtained on dilution of the residue with water was recrystallized twice from aqueous methanol to yield 0.77 g. of 17β-dimethylamino-17-vinylandrost-4-en-3-one (IIIc) with a melting point of 154 to 156° C. and λ max. 3030, 2750, 1670, 1637 and 1615 cm.$^{-1}$.

Analysis.—Calcd. for $C_{23}H_{35}NO$: C, 80.88; H, 10.33; N, 4.10. Found: C, 81.14; H, 10.29; N, 4.18.

EXAMPLE 16

*17β - Dimethylamino - 17-Vinylandrost-4-En-11β-Ol-3-One (17β - N,N-Dimethylamino-17-Vinyl-4-Androsten-11β-Ol-3-One) (IIIc)*

In the same manner as in Example 15, but substituting as starting material, 17β-dimethylamino-17-ethynylandrost-4-en-11β-ol-3-one (IIIb) (prepared as in Example 14) for 17β-dimethylamino-17-ethynylandrost-4-en-3-one, is productive of the corresponding 17β-dimethylamino-17-vinylandrost-4-en-11β-ol-3-one (IIIc).

EXAMPLE 17

*17β - Dimethylamino - 17-Methyl-5α-Androstan-11β-Ol (17β - N,N-Dimethylamino - 17-Methyl-5α-Androstan-11β-Ol) (II)*

A solution of 1 g. of 17β-dimethylamino-17-cyano-5α-androstan-11β-ol (I) (prepared as in Example 3) in 20 ml. of tetrahydrofuran was added to 10 ml. of 3 molar methylmagnesium iodide in ether. The reaction mixture was heated under reflux for a period of about 3 hours, following which the excess Grignard reagent was destroyed with water and additional water, ether and also methylene chloride added. The organic layer was washed well with brine, dried by percolation through magnesium sulfate and the solvent removed under vacuum. The residue was crystallized from aqueous ethanol to yield 0.7 g. of 17β-dimethylamino-17-methyl-5α-androstan-11β-ol (II) as fine long needles with a melting point of 164 to 165° C.

Analysis.—Calcd. for $C_{22}H_{39}NO$: C, 79.22; H, 11.79; N, 4.20. Found: C, 79.06; H, 12.08; N, 4.51.

In the same manner as in Example 17, but substituting for 17β-dimethylamino-17-cyano-5α-androstan-11β-ol and methyl-magnesium iodide, another 17β-dialkylamino-17-cyano-5α-androst-11β-ol and another alkylmagnesium halide, is productive of the corresponding 17β-dialkylamino-17-alkyl-5α-androstan-11β-ol (II).

EXAMPLE 18

*17β-Dimethylamino-17-Methyl-5α-Androstan (17β-N,N-Dimethylamino-17-Methyl-5α-Androstan) (II)*

In the same manner as in Example 17, but substituting as starting material, 17β-dimethylamino-17-cyano-5α-androstan (I) (prepared as in Example 4) for 17β-dimethylamino-17-cyano-5α-androstan-11β-ol, is productive of the corresponding 17β-dimethylamino-17-methyl-5α-androstan (II).

EXAMPLE 19

*17β - Dimethylamino - 17-Ethynyl-5α-Androstan-11β-Ol (17β - N,N-Dimethylamino-17-Ethynyl-5α-Androstan-11β-Ol) (III)*

A solution of 1.81 g. of 17β-dimethylamino-17-cyano-5α-androstan-11β-ol (I) (prepared as in Example 3) in 30 ml. of tetrahydrofuran was added to an ether-free solution of 0.087 mole of ethynylmagnesium bromide (prepared from 24 ml. of 3 molar methylmagnesium bromide in ether) in 100 ml. of tetrahydrofuran. This reaction mixture was heated under reflux for a period of about 18 hours and allowed to cool. Water, methylene chloride and ether were added, and the organic layer separated. The organic layer was washed thoroughly with brine and then extracted with 100 ml. of 0.5 N hydrochloric acid. The crude material obtained on making the acidic solution alkaline was crystallized from aqueous methanol to give 0.96 g. of product with a melting point of 159.5 to 161.5° C. Recrystallization of a sample of this product yielded pure 17β-dimethylamino-17-ethynyl-5α-androstan-11β-ol (III) with a melting point of 160 to 161° C. and infrared absorptions at 3400, 3280 and 2780 cm.$^{-1}$.

Analysis.—Calcd. for $C_{23}H_{37}NO$: C, 80.41; H, 10.86; N, 4.08. Found: C, 80.55; H, 10.71; N, 4.30.

In the same manner as in Example 19, but substituting for 17β-dimethylamino-17-cyano-5α-androstan-11β-ol another 17β-dialkylamino-17-cyano-5α-androstan-11β-ol, is productive of the corresponding 17β-dialkylamino-17-ethynyl-5α-androstan-11β-ol (III).

Following the procedure of Example 19, but substituting propynylmagnesium bromide for ethynylmagnesium bromide, yields 17β-dimethylamino-17-propynyl-5α - androstan-11β-ol.

EXAMPLE 20

*17β-Dimethylamino-17-Ethynyl-5α-Androstan (17β-N,N-Dimethylamino-17-Ethynyl-5α-Androstan) (III)*

In the same manner as in Example 19, but substituting as starting material, 17β-dimethylamino - 17 - cyano - 5α-androstan (I) (prepared as in Example 4) for 17β-dimethylamino-17-cyano-5α-androstan-11β-ol, is productive of the corresponding 17β-dimethylamino-17-ethynyl-5α-androstan (III).

EXAMPLE 21

*17β-Dimethylamino-17-Methyl - 3 - Methoxyestra - 1,3,5-Triene (17β-N,N-Dimethylamino-17-Methyl - 3 - Methoxy-1,3,5-Estratriene) (II)*

A solution of 1.5 g. of 17β-dimethylamino-17-cyano-3-methoxyestra-1,3,5-triene (I) (prepared as in Example 5) in 25 ml. of tetrahydrofuran was added to 10 ml. of 3 molar methylmagnesium bromide in ether. The reaction mixture was heated under reflux for a period of about 3 hours, following which the excess Grignard reagent was destroyed with water and additional water, ether and also methylene chloride added. The organic layer was washed well with brine, dried by percolation through magnesium sulfate and the solvent removed under vacuum to give 1.2 g. of product with a melting point of 104 to 108° C. A single crystallization of this product from aqueous methanol provided 1.1 g. of fine long needles with a melting point of 110.5 to 112° C. Recrystallization of a sample of this material from aqueous methanol yielded pure 17β-dimethylamino-17-methyl-3-methoxyestra-1,3,5-triene (II) with a melting point of 110.5 to 111.5° C.

Analysis.—Calcd. for $C_{22}H_{33}NO$: C, 80.68; H, 10.16; N, 4.28. Found: C, 80.77; H, 10.40; N, 4.52.

In the same manner as in Example 19, but substituting for 17β-diethylamino-17-cyano-3-methoxyestra-1,3,5 - triene and methylmagnesium bromide, another 17β-dialkylamino-17-cyano-3-methoxyestra-1,3,5-triene and another alkylmagnesium halide, is productive of the corresponding 17β-dialkylamino-17-alkyl-3-methoxyestra-1,3,5-triene (II).

EXAMPLE 22

*17β-Dimethylamino-17-Methyl-3-Methoxyestra-1,3,5 - Triene-11β-Ol (17β-N,N-Dimethylamino - 17 - Methyl - 3-Methoxy-1,3,5-Estratriene-11β-Ol) (II)*

In the same manner as in Example 21, but substituting as starting material, 17β-dimethylamino-17-cyano-3-methoxyestra-1,3,5-triene-11β-ol (I) (prepared as in Example 6) for 17β-dimethylamino-17-cyano-3-methoxyestra-1,3,5-triene, is productive of the corresponding 17β-dimethylamino-17-methyl-3-methoxyestra-1,3,5-triene - 11β-ol (II).

EXAMPLE 23

*17β-Dimethylamino-17-Ethynyl - 3 - Methoxyestra - 1,3,5-Triene (17β-N,N-Dimethylamino-17-Ethynyl-3 - Methoxy-1,3,5-Estratriene) (III)*

A solution of 1.5 g. of 17β-dimethylamino-17-cyano-3-methoxyestra-1,3,5-triene (I) (prepared as in Example 5) in 25 ml. of tetrahydrofuran was added to 0.03 mole of ethynylmagnesium bromide in 20 ml. of ether-free tetrahydrofuran. The mixture was heated under reflux for a period of about 4 hours and allowed to cool. Water, methylene chloride and ether were added and the organic layer separated. The organic layer was washed thoroughly with brine and then extracted with 100 ml. of 0.5 N hydrochloric acid. The crude material obtained on making the acidic solution alkaline, was crystallized twice from a mixture of chloroform and hexane to give 0.6 g. of product with a melting point of 198 to 200° C. Further recrystallization of a sample of this material employing the same solvents, yielded pure 17β-dimethylamino-17-methyl-3-methoxyestra-1,3,5-triene (III) with a melting point of 199.5 to 201° C.

*Analysis.*—Calcd. for $C_{23}H_{31}NO$: C, 81.85; H, 9.29; N, 4.15. Found: C, 81.94; H, 9.68; N, 4.61.

In the same manner as in Example 23, but substituting for 17β-dimethylamino-17-cyano-3-methoxyestra-1,3,5-triene another 17β-dialkylamino-17-cyano-3-methoxyestra-1,3,5-triene, is productive of the corresponding 17β-dialkylamino-17-ethynyl-3-methoxyestra-1,3,5-triene (III).

Following the procedure of Example 23, but substituting propynylmagnesium bromide for ethynylmagnesium bromide, yields 17β-dimethylamino-17-propynyl-3-methoxyestra-1,3,5-triene.

EXAMPLE 24

*17β-Dimethylamino-17-Ethynyl-3 - Methoxyestra - 1,3,5-Triene-11β-Ol (17β-N,N-Dimethylamino-17-Ethynyl-3-Methoxy-1,3,5-Estratriene-11β-Ol) (III)*

In the same manner as in Example 23, but substituting as starting material, 17β-dimethylamino-17-cyano-3-methoxyestra-1,3,5-triene-11β-ol (I) (prepared as in Example 6) for 17β-dimethylamino-17-cyano-3-methoxyestra-1,3,5-triene, is productive of the corresponding 17β-dimethylamino-17-ethynyl-3-methoxyestra-1,3,5-triene-11β-ol (III).

I claim:
1. Compounds represented by the formula:

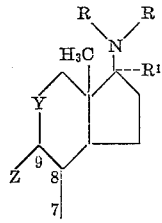

wherein R is selected from the group consisting of methyl and ethyl; $R^1$ is selected from the group consisting of $CH_3$, $C_2H_5$, $C_3H_7$, C≡CH, C≡C—$CH_3$, CH=$CH_2$, —$CT_2$—CH=$CH_2$ and CN; Y is selected from the group consisting of the methylene radical, >$CH_2$ and the β-hydroxymethylene radical,

Z is selected from the group consisting of

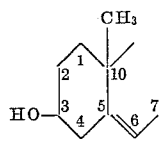

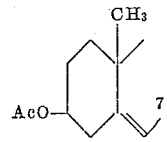

and

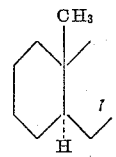

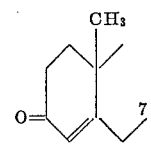

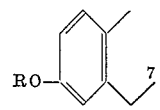

wherein R has the same value as above and Ac is the acyl radical of a hydrocarbon carboxylic acid containing from 1 to 12 carbon atoms, inclusive.

2. 17β-dimethylamino-17-cyanoandrost-5 - en - 3β - ol acetate.
3. 17β-dimethylamino-17-cyanoandrost-5-en-3β-ol.
4. 17β-dimethylamino-17-methylandrost-5-en-3β-ol.
5. 17β-dimethylamino - 17 - methylandrost - 5 - en-3β-ol·¼$H_2O$.
6. 17β-dimethylamino-17-ethynylandrost-5-en-3β-ol.
7. 17β-dimethylamino - 17 - ethynylandrost - 5-en-3β-ol·¼$H_2O$.
8. 17β-dimethylamino-17-cyano-5α-androstan-11β-ol.
9. 17β-dimethylamino-17-methyl-5α-androstan-11β-ol.
10. 17β-dimethylamino-17 - ethynyl - 5α - androstan-11β-ol.
11. 17β-dimethylamino-17-methylandrost-4-en-3-one.
12. 17β-dimethylamino-17-ethynylandrost-4-en-3-one.
13. 17β-dimethylamino-17-vinylandrost-4-en-3-one.
14. 17β-dimethylamino - 17 - cyano-3 - methoxyestra-1,3,5-triene.
15. 17β-dimethylamino-17-methyl - 3 - methoxyestra-1,3,5-triene.
16. 17β-dimethylamino-17-ethynyl - 3 - methoxyestra-1,3,5-triene.
17. A process for the production of 17α-alkynyl compounds of the Formula A:

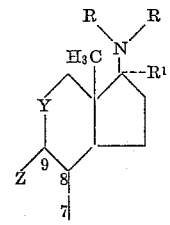

wherein R is selected from the group consisting of methyl and ethyl; $R^1$ is selected from the group consisting of C≡CH and C≡C—$CH_3$; Y is selected from the group consisting of the methylene radical, >$CH_2$ and the β-hydroxymethylene radical,

Z is selected from the group consisting of

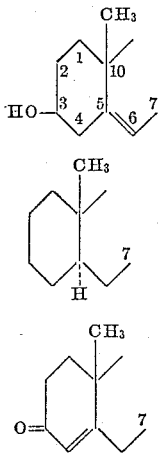

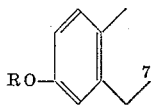

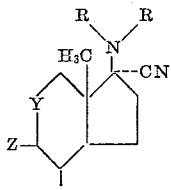

and wherein R has the same value as above; which comprises reacting a starting compound of the Formula B:

(B)

wherein R, Y and Z are defined as above, with an alkynyl magnesium halide to produce the corresponding 17α-alkynyl compounds of Formula A.

18. A process for the production of 17β-dimethylamino-17-ethynylandrost-5-en-3β-ol which comprises reacting 17β-dimethylamino-17-cyanoandrost-5-en-3β-ol acetate with ethynylmagnesium bromide to produce 17β-dimethylamino-17-ethynylandrost-5-en-3β-ol.

19. A process for the production of 17β-dimethylamino-17-ethynylandrost-4-en-3-one which comprises reacting 17β-dimethylamino-17-cyanoandrost-5-en-3β-ol acetate with ethynylmagnesium bromide to produce 17β-dimethylamino-17-ethynylandrost-5-en-3β-ol, followed by reacting said compound with an oxidizing agent to produce 17β-dimethylamino-17-ethynylandrost-4-en-3-one.

20. A process according to claim 19 wherein the oxidizing agent is cyclohexanone in the presence of aluminum isopropoxide.

21. A process for the production of 17β-dimethylamino-17-ethynyl-5α-androstan-11β-ol which comprises reacting 17β-dimethylamino-17-cyano-5α-androstan-11β-ol with ethynylmagnesium bromide to produce 17β-dimethylamino-17-ethynyl-5α-androstan-11β-ol.

22. A process for the production of 17β-dimethylamino-17-ethynyl-3-methoxyestra-1,3,5-triene which comprises reacting 17β-dimethylamino-17-cyano-3-methoxyestra-1,3,5-triene with ethynylmagnesium bromide to produce 17β-dimethylamino-17-ethynyl-3-methoxyestra-1,3,5-triene.

References Cited in the file of this patent

UNITED STATES PATENTS

| | | |
|---|---|---|
| 2,561,378 | Julian et al. | July 24, 1951 |
| 2,705,238 | Julian et al. | Mar. 29, 1955 |
| 3,009,925 | Babcock et al. | Nov. 21, 1961 |